United States Patent
Guerin (10) Patent No.: US 10,657,091 B2
(45) Date of Patent: May 19, 2020

(54) SPECULATIVE EXECUTION IN A DISTRIBUTED STREAMING SYSTEM

(71) Applicant: INTERNATIONAL BUSINESS MACHINES CORPORATION, Armonk, NY (US)

(72) Inventor: Xavier R. Guerin, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/046,760

(22) Filed: Jul. 26, 2018

(65) Prior Publication Data

US 2020/0034326 A1 Jan. 30, 2020

(51) Int. Cl.
*G06F 13/42* (2006.01)
*G06F 9/38* (2018.01)

(52) U.S. Cl.
CPC ............ *G06F 13/42* (2013.01); *G06F 9/3842* (2013.01)

(58) Field of Classification Search
CPC .............................. G06F 13/42; G06F 9/3842
See application file for complete search history.

(56) References Cited

U.S. PATENT DOCUMENTS

| 2005/0226408 A1* | 10/2005 | Hotz | H04L 9/0662 380/28 |
| 2007/0043871 A1* | 2/2007 | Sweedler | H04L 69/22 709/227 |
| 2013/0080651 A1 | 3/2013 | Pope et al. | |
| 2017/0024167 A1 | 1/2017 | Lavasani | |
| 2018/0145951 A1* | 5/2018 | Varadarajan | H04W 12/02 |

OTHER PUBLICATIONS

Hoefler et al., "sPIN: High-performance streaming Processing in the Network," ACM SC17, Nov. 12-17, 2017 (20 pages).
Goumas et al., "Overlapping Computation and Communication in SMT Clusters with Commodity Interconnects," IEEE International Conference on Cluster Computing and Workshops, 2009 (10 pages).

* cited by examiner

*Primary Examiner* — Zachary K Huson
(74) *Attorney, Agent, or Firm* — Griffiths & Seaton PLLC (57) ABSTRACT

Embodiments for speculative execution in a distributed streaming system by a processor. Incoming data from a data packet may be shared with one or more applications for immediate processing upon the incoming data becoming available on an input/output (I/O) interface to enable overlapping of computation and communication in the distributed streaming system. A validity of the shared incoming data may be indicated to the one or more applications.

20 Claims, 8 Drawing Sheets

SPECULATIVE EXECUTION IN A DISTRIBUTED STREAMING SYSTEM

BACKGROUND OF THE INVENTION

Field of the Invention

The present invention relates in general to computing systems, and more particularly to, various embodiments for speculative execution in a distributed streaming system using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing and storing very large amounts of information is a key problem to solve.

SUMMARY OF THE INVENTION

Various embodiments for speculative execution in a distributed streaming system by a processor are provided. Incoming data from a data packet may be shared with one or more applications for immediate processing upon the incoming data becoming available on an input/output (I/O) interface to enable overlapping of computation and communication in the distributed streaming system. A validity of the shared incoming data may be indicated to the one or more applications.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Stream-oriented applications process data inputs in a linear fashion. That is to say, given an amount of N bytes, stream-oriented applications process the amount of N bytes from byte-1 to byte-N, at various granularity (e.g., byte-by-byte or in groups of K bytes). However, traditional networking hardware (e.g., Ethernet, InfiniBand, etc.) handle upstream and downstream data at a granularity of a packet and only make the data available to the system software when the data has been properly error-checked.

Therefore, stream-oriented applications are arbitrarily forced to process incoming data in sequence with regard to its transfer even when it would be possible to process that same data in parallel with regard to its transfer. As a result, stream-oriented applications need to rely on coarser-grained operations to simulate parallelism, such as kernel threads or coroutines, at a cost of non-negligible overhead (e.g., the latency difference between a peripheral component interconnect express "PCIe" transfer of one cache line and two context switches is one order of magnitude).

Accordingly, the present invention provides for communicating hardware to share incoming data with upstream system layers as soon as that data is available on the communicating hardware input port. Once fully received, the communicating hardware may share with the upstream system layers whether the processed data is valid.

In an additional aspect, the communicating hardware may implement a network interface controller ("NIC") that would notify upstream layers of data availability at the first input data sample (e.g., "commencement notification") and notify upstream layers once the data packet has been fully received and error-checked (e.g., "completion notification").

Also, the communicating hardware may implement a persisting distributed key-value store, supporting inline encryption and compression of data, that may notify upstream layers of data availability (e.g., the commencement notification) at the first input command sample and notify upstream layers once the data has been fully decompressed, decrypted, and persisted (e.g., the completion notification). Upon receiving the commencement notification, the application may start processing the incoming data as a stream using a processor cache component as a passive synchronization operation. Upon receiving the completion notification, the application may either commit to the change or rollback the change that has been computed.

In one aspect, the mechanisms of the various embodiments provide for speculative execution in a distributed streaming system. Incoming data from a data packet may be shared with one or more applications for immediate processing upon the incoming data becoming available on an input/output (I/O) interface to enable overlapping of computation and communication in the distributed streaming system. A validity of the shared incoming data may be indicated to the one or more applications.

In one aspect, rather than waiting for a complete data packet and a guarantee that the data packet is valid, a first sample of incoming data is pushed to a processor cache as soon as the first sample is received by the I/O network card. An application is then notified of the incoming data. Once the application is notified of the incoming data, the application will access a buffer and immediately start consuming and processing each incoming sample (e.g., sample by sample). In this way, the application may immediately start processing the incoming sample of data prior to receiving the complete data packet. Thus, the distributed streaming system is "speculative" because when the application is processing the data samples, the application is unware as to whether the incoming data sample is correct. Thus, the application may be performing a faulty computation on the incoming data sample. However, upon receiving the complete data packet, a notification is sent to the application indicating that the parsed, incoming data sample was correct. If one or more of the incoming data samples was incorrect, the application is enabled to perform a rollback operation.

In an additional aspect, the present invention provides for a passive cache-based synchronization operation that may be used to guarantee synchronization between the application, consuming each of the incoming data samples, and hardware (e.g., a network card). For example, when a hardware device (e.g., a network card), which is located on the computing device (e.g., a processor device), pushes a sample of incoming data up to the processor, the sample of incoming data is re-routed from going to a memory and may go directly to a cache. Thus, each sample of data received in the cache will fill a cache line. The cache line is the minimum atomic unit of data synchronization between the processor and a memory. The cache line may be pushed onto a local bus (e.g., Peripheral Component Interconnects (PCI) bus). The PCI root may look at the destination address of the incoming data and at the processor cache to determine whether the processor cache contains that address. If the address is present, the data is placed immediately into the cache.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
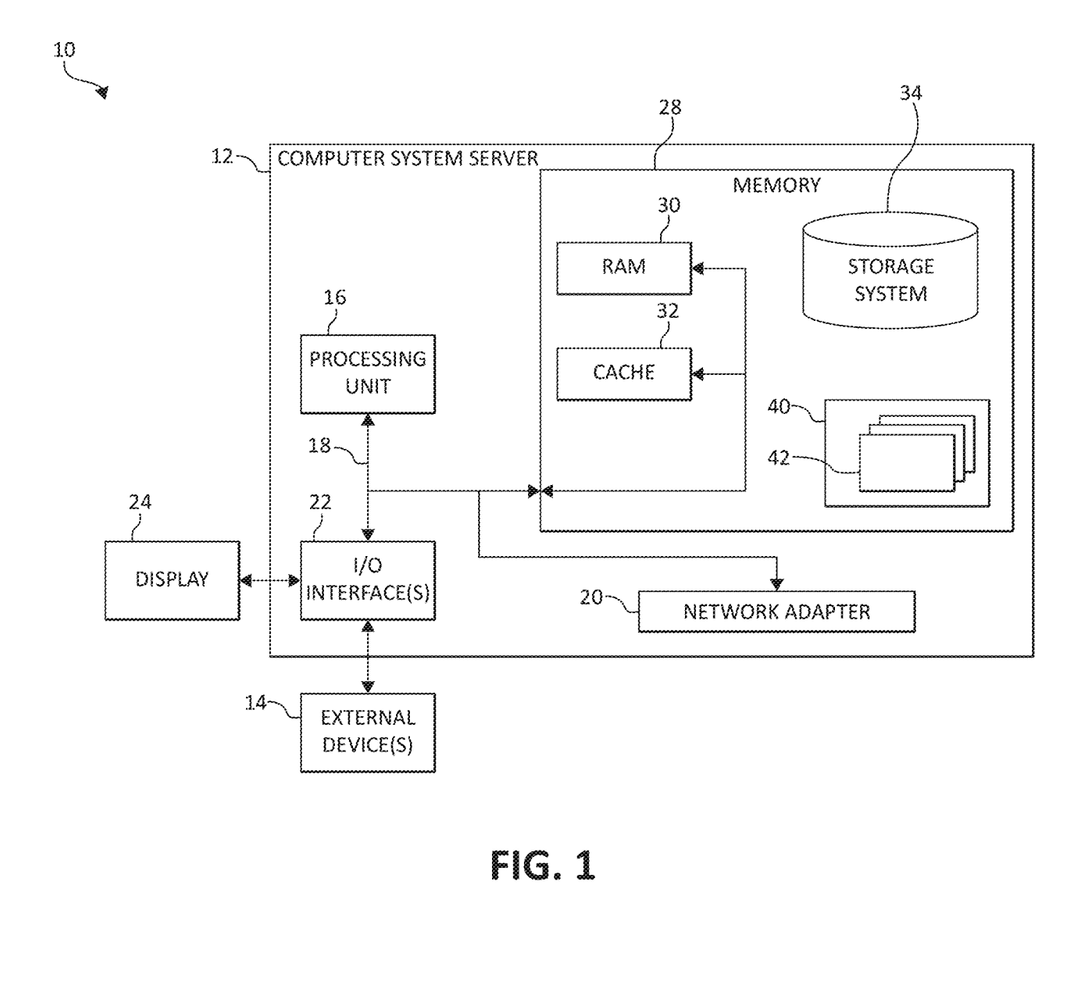
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
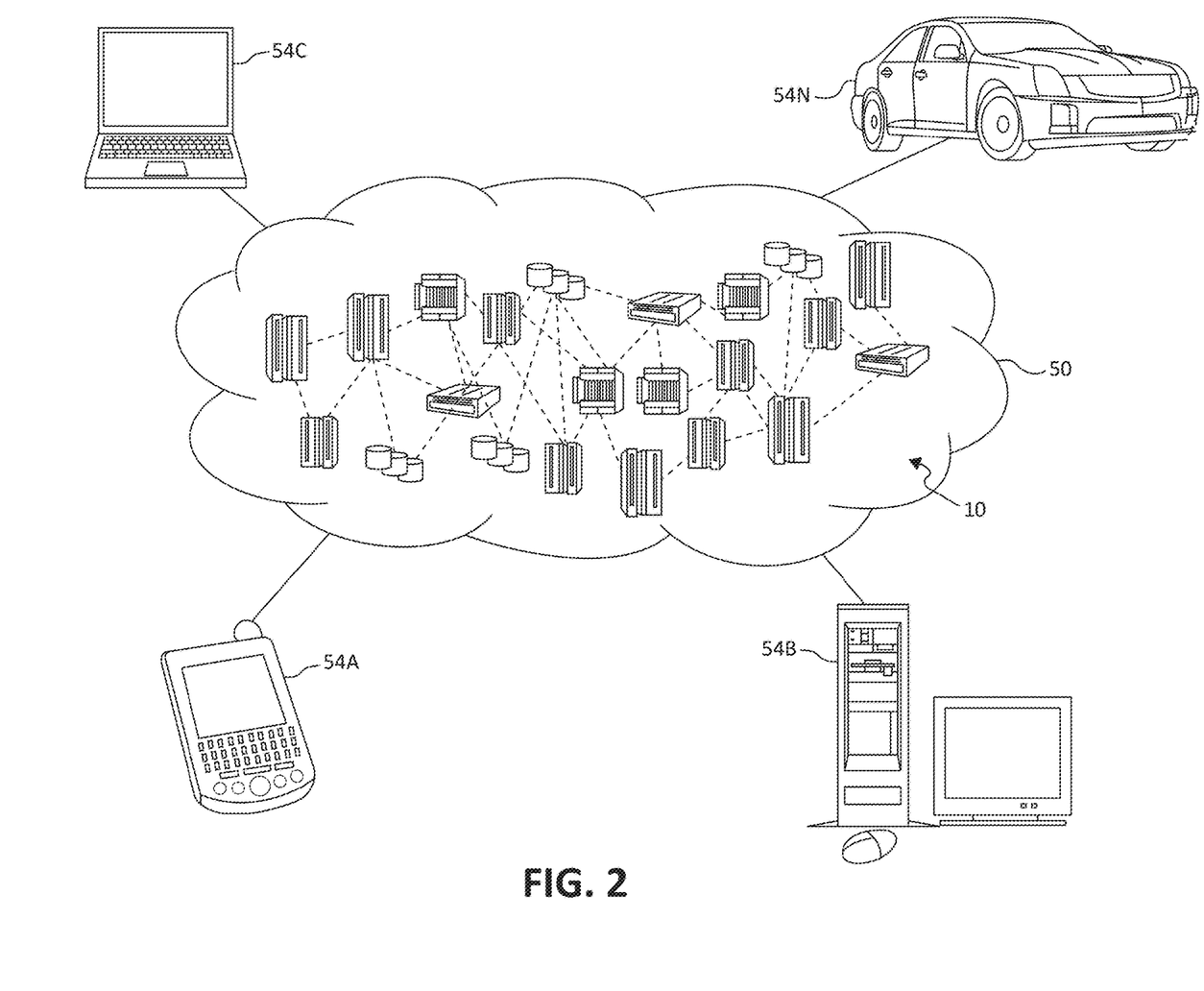
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
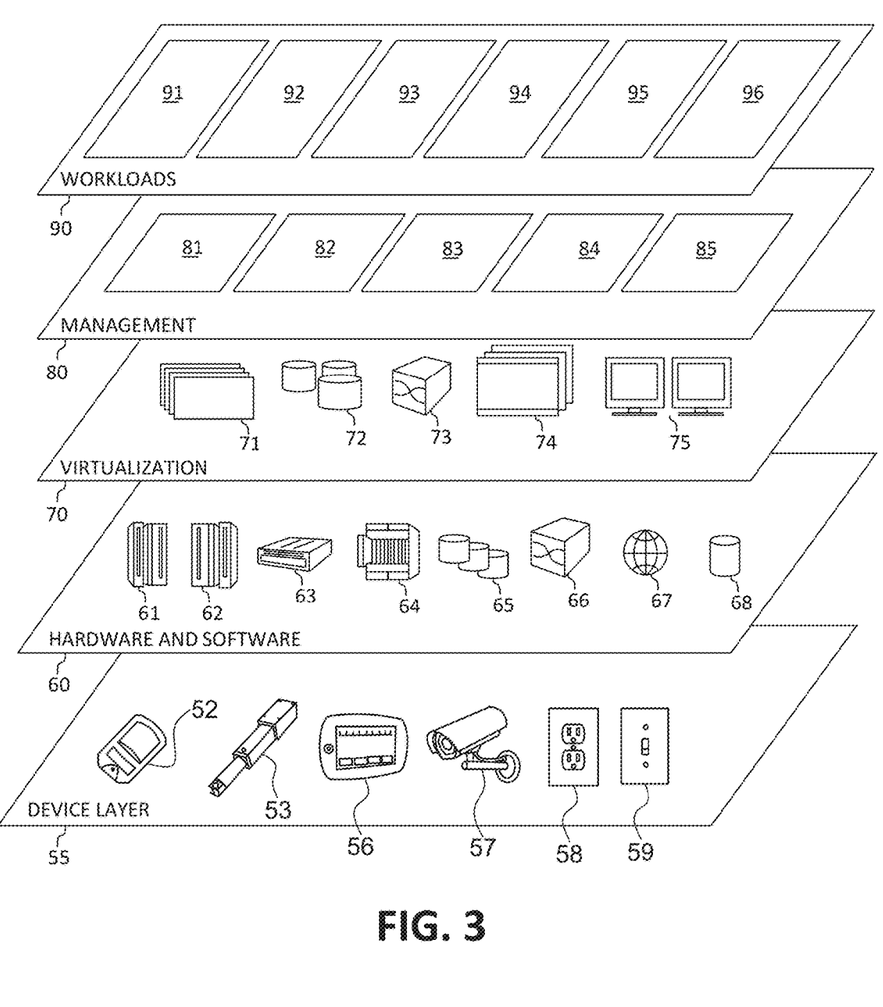
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for speculative execution in a distributed streaming system. In addition, workloads and functions 96 for speculative execution in a distributed streaming system may include such operations as data analysis (including data collection and processing from various environmental sensors), metadata tagging, storage resource utilization analytics using metadata tags, and/or analytics operations. One of ordinary skill in the art will appreciate that the workloads and functions 96 for speculative execution in a distributed streaming system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
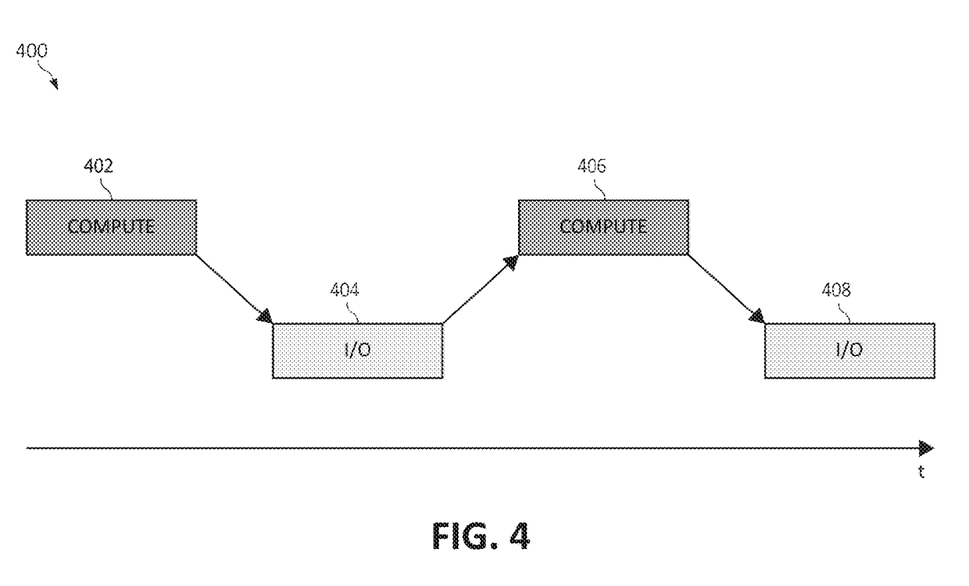
FIG. 4 is an additional block diagram depicting delays in processing a data packet until arrival completion.

As previously mentioned, the mechanisms of the illustrated embodiments provide novel approaches for efficient overlapping of computation and communication in stream-oriented distributed computing. Turning now to FIG. 4, a block diagram 400 depicts the current challenges in overlapping of computation and communication. As depicted, FIG. 4 depicts the strict requirements of serialization between computation ("compute") 402 and/or 406 and input/output ("I/O") operations 404 and/or 408. In other words, initiating processor must complete processing each instruction/compute 402 and/or 406 before beginning to process the next instruction (I/O operations 404 and/or 408).

However, overlapping of computation and communication can be categorized two-ways. Category 1) is a best case scenario where the data is already present in the buffer and the application does not wait and can consume the data immediately, forever. Category 2) is a worst case scenario where the application must wait for each single packet to fully arrive before processing (e.g., 1 packet equals 1500B, 1.5 micro seconds to transfer over PCIe, approximately 4500 instructions on a 3.0 gigahertz ("GHz") processor). In many cases, applications may be categorized as category 1 or category 2 with some degree of complication (e.g., packet drops in the case of the best case scenario if the application is too slow). However, streaming applications are usually real-time applications that process incoming data at line rate. In that situation the application is fast enough is fast enough to process each packet as they are received but is still forced to wait for the full packet to complete as depicted in FIG. 4.

Figure 5:
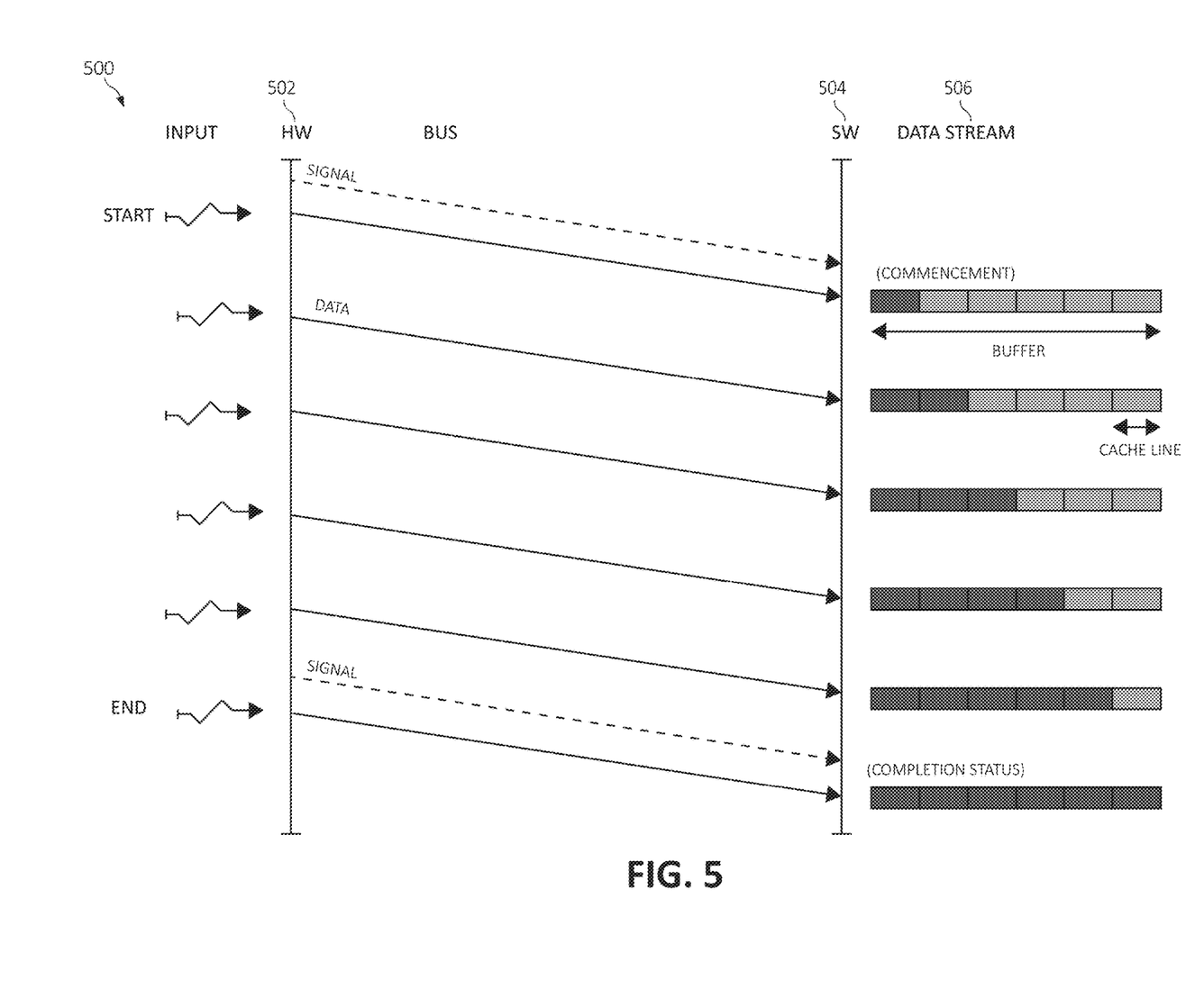
FIG. 5 is an additional block diagram depicting passive cache-based synchronization in accordance with aspects of the present invention.

Turning now to FIG. 5, block diagram 500 depicts passive cache-based synchronization for increasing efficiency in overlapping of computation and communication in stream-oriented distributed computing. As depicted, incoming data (e.g., "input") may be received via a communicating hardware (HW) 502 (e.g., input/output interface and/or network interface controller "NIC"). The HW 502 may share incoming data from a data packet with one or more applications 504 ("SW") for immediate processing upon the incoming data becoming available on the HW 502 (e.g., I/O interface) to enable overlapping of computation and communication in the distributed streaming system. The application 504 progresses through the data stream 506 by recognizing which cache line has been updated and which cache lines have not been updated, which may be referred to herein as passive cache-based synchronization that uses a special marker to differentiate between cache lines that have and have not been updated.

The passive cache-based synchronization allows the sharing of data between a reader (e.g., the application 504) and a writer (e.g., the hardware 502) at a granularity of a cache line. The passive cache-based synchronization relies on the fact that the cache line updates are atomically visible from a central processing unit ("CPU") subsystem at a granularity of a cache line. Both the reader and the writer must agree, for example, upon a magic word. Before a buffer is commissioned for transfer, the first word of each of its cache lines may be overwritten using that magic word. Once the buffer is commissioned, the writer can use the buffer to transfer one cache line at a time. Each transfer overwrites the first word of each cache line, effectively marking the cache line as dirty.

Once the transfer is completed, the buffer may be decommissioned. Before the writer starts transferring data, the write sends a commencement signal to the reader (e.g., the application 504). The commencement signal lets the reader know that a buffer is now available and can be prefetched. Then, the reader starts polling the buffer, cache line by cache line, until a completion signal is received. The completion signal lets the reader know when a transfer is complete and if the transferred data is valid. In one aspect, the completion signal may be tailored based on the communicating hardware 502. A completion signal may signify the completion of the data transfer, and/or in a distributed persistent key-value store, the completion signal signifies that a command has been persisted. Thus, as illustrated, the passive cache-based synchronization operation may be used to guarantee the synchronization between the application 504 consuming each of the incoming data samples and hardware 502 (e.g., a network card).

Figure 6:
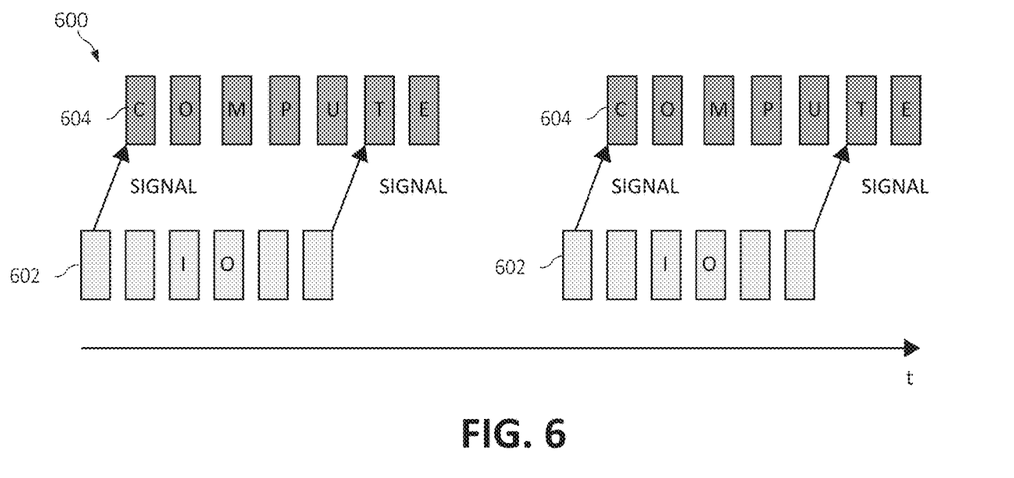
FIG. 6 is an additional block diagram depicting overlapping of computation and communication in accordance with aspects of the present invention.

FIG. 6 is an additional block diagram depicting overlapping of computation and communication. That is, during time (t), the I/O interface 602 receives a first incoming data sample ("I/O") and pushes it to the application 604 for immediate computation ("compute"). Again, the I/O interface 602 may continue to receive an nth number additional incoming data samples. Each of the nth number additional incoming data samples are pushed by the I/O interface 602 to the application 604 for immediate computation. As illustrated, the computation latency of each incoming data sample is such that the time it takes the I/O interface 602 to push a next incoming data sample is equal to, less than, and/or substantially similar to the time it takes for the application to process the previously received incoming data sample. Said differently, the sending of a sample data by the I/O interface 602 is in parallel to the computation of a data sample by the application. As a sample of incoming data is received by the I/O 602 interface, the application 604 may immediately start computing each individual data sample to enable overlapping of computation and communication in the distributed streaming system.

Thus, the present invention overlaps each computation and upload of the incoming data from I/O from I/O interface 602. The incoming data samples from a data packet may overlap each computation and communication can be computed earlier and more frequently, leading to faster decisions. Also, each computation by application 604 may also reach a termination point before the full packet is received.

Figure 7:
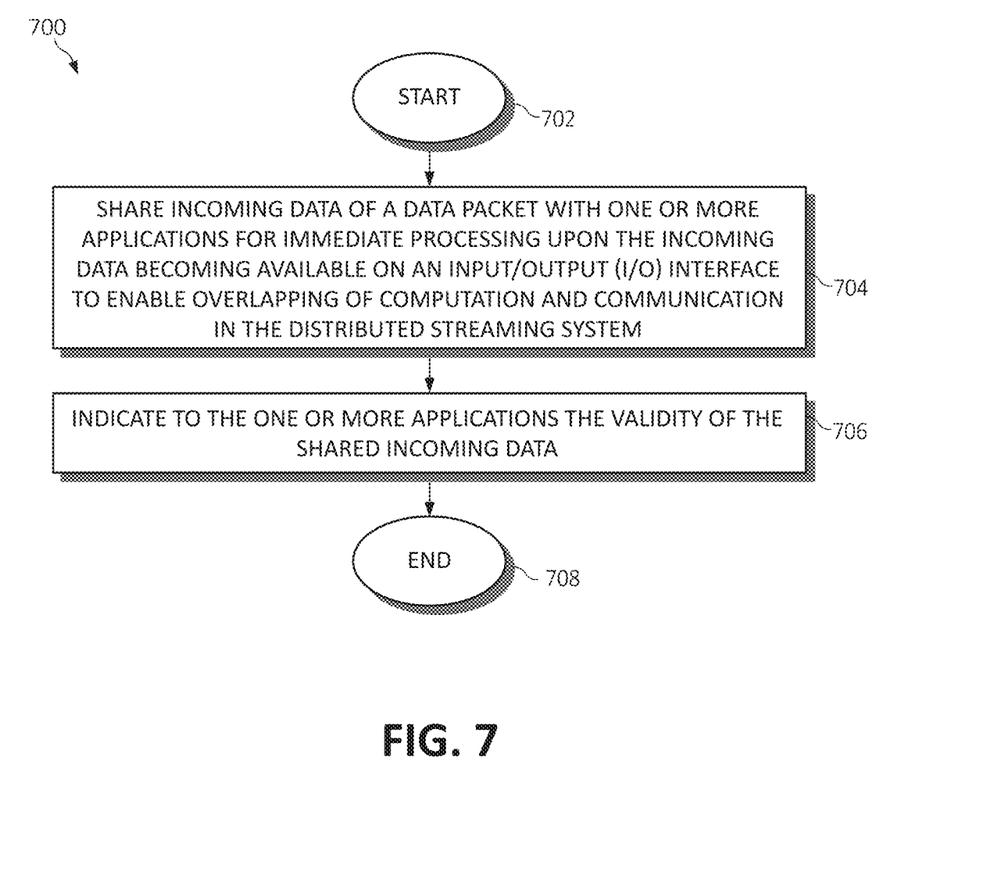
FIG. 7 is a flowchart diagram depicting an exemplary method for speculative execution in a distributed streaming system in which aspects of the present invention may be realized.

Turning now to FIG. 7, a method 700 for speculative execution in a distributed streaming system is depicted, in which various aspects of the illustrated embodiments may be implemented. The functionality 700 may be implemented as a method executed as instructions on a machine, where the instructions are included on at least one computer readable medium or on a non-transitory machine-readable storage medium.

The functionality 700 may start in block 702. Incoming data from a data packet may be shared with one or more applications for immediate processing upon the incoming data becoming available on an input/output (I/O) interface to enable overlapping of computation and communication in the distributed streaming system, as in block 704. A validity of the shared incoming data may be indicated to the one or more applications, as in block 706. The functionality 700 may end in block 708.

Figure 8:
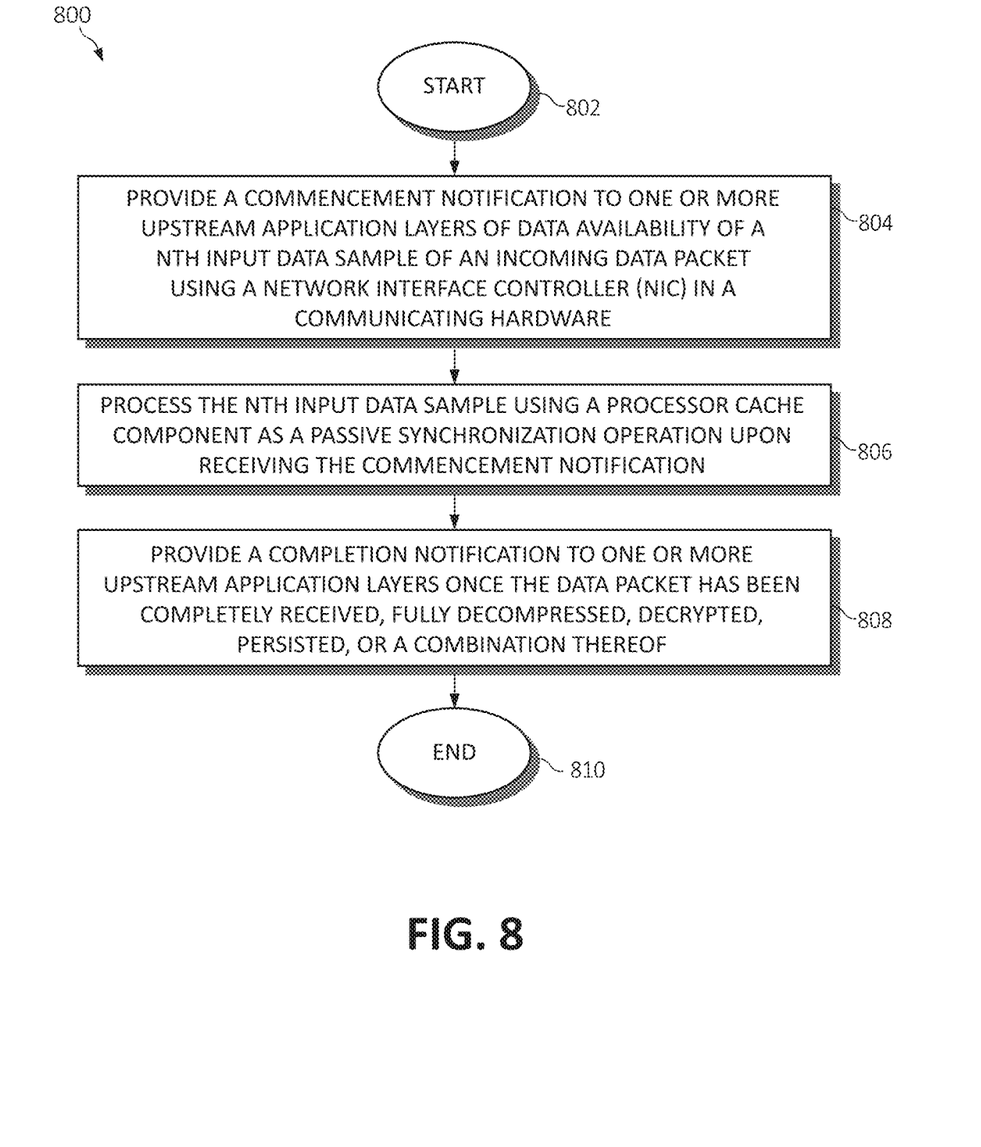
FIG. 8 is an additional flowchart diagram depicting an exemplary method for speculative execution in a distributed streaming system by a processor; again, in which aspects of the present invention may be realized.

Turning now to FIG. 8, an additional method 800 for speculative execution in a distributed streaming system is depicted, in which various aspects of the illustrated embodiments may be implemented. The functionality 800 may be implemented as a method executed as instructions on a machine, where the instructions are included on at least one computer readable medium or on a non-transitory machine-readable storage medium.

The functionality 800 may start in block 802. A commencement notification may be provided to one or more upstream application layers of data availability of an nth input data sample of an incoming data packet using a Network Interface Controller (NIC) in a communicating hardware, as in block 804. The nth input data sample may be processed by he one or more upstream application layers using a processor cache component as a passive synchronization operation upon receiving the commencement notification, as in block 806. A completion notification may be provided to one or more upstream application layers once the data packet has been completely received, fully decompressed, decrypted, "persisted " (e.g., the data packet is made persistent), or a combination thereof, as in block 808. The functionality 800 may end in block 810.

In one aspect, in conjunction with and/or as part of at least one block of FIGS. 7-8, the operation of methods 700 and/or 800 may include each of the following. The operation of functionality 700 and/or 800 may provide a commencement notification (e.g., using a distributed key-value store that supports encryption and compression of the incoming data) to the one or more applications of a nth sample of the incoming data to enable processing of the nth sample by the one or more applications. A completion notification may be provided to the one or more applications indicating a validity of the shared incoming data upon completion of receiving the data packet.

The operation of functionality 700 and/or 800 may provide a completion notification to the one or more applications using a distributed key-value store once the shared incoming data is completely decompressed, decrypted, persisted, or a combination thereof. The operation of functionality 700 and/or 800 may instructions commit a change or perform a rollback of the change to the incoming data upon receipt of a completion notification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for speculative execution in a distributed streaming system, comprising:
    sharing incoming data comprising a portion of an incomplete data packet with one or more applications for immediate processing upon the incoming data becoming available on an input/output (I/O) interface to enable overlapping of computation and communication in the distributed streaming system; wherein the one or more applications speculatively execute the portion of the incomplete data packet, prior to receiving all portions of the incomplete data packet, upon the portion of the incomplete data packet becoming available on the I/O interface; and
    indicating to the one or more applications a validity of the shared incoming data.

2. The method of claim 1, further including providing a commencement notification to the one or more applications of a nth sample of the incoming data to enable processing of the nth sample by the one or more applications.

3. The method of claim 1, further including providing a commencement notification to the one or more applications using a distributed key-value store that supports encryption and compression of the incoming data.

4. The method of claim 1, further including processing a nth sample of the incoming data using a processor cache component by the one or more applications upon receipt of a commencement notification.

5. The method of claim 1, further including providing a completion notification to the one or more applications indicating a validity of the shared incoming data upon completion of receiving the data packet.

6. The method of claim 5, further including providing the completion notification to the one or more applications using a distributed key-value store once the shared incoming data is completely decompressed, decrypted, persisted, or a combination thereof.

7. The method of claim 1, further including committing a change or performing a rollback of the change to the incoming data upon receipt of a completion notification.

8. A system for speculative execution in a distributed streaming system, comprising:
one or more computers with executable instructions that when executed cause the system to:
share incoming data comprising a portion of an incomplete data packet with one or more applications for immediate processing upon the incoming data becoming available on an input/output (I/O) interface to enable overlapping of computation and communication in the distributed streaming system; wherein the one or more applications speculatively execute the portion of the incomplete data packet, prior to receiving all portions of the incomplete data packet, upon the portion of the incomplete data packet becoming available on the I/O interface; and
indicate to the one or more applications a validity of the shared incoming data.

9. The system of claim 8, wherein the executable instructions provide a commencement notification to the one or more applications of a nth sample of the incoming data to enable processing of the nth sample by the one or more applications.

10. The system of claim 8, wherein the executable instructions provide a commencement notification to the one or more applications using a distributed key-value store that supports encryption and compression of the incoming data.

11. The system of claim 8, wherein the executable instructions process a nth sample of the incoming data using a processor cache component by the one or more applications upon receipt of a commencement notification.

12. The system of claim 8, wherein the executable instructions provide a completion notification to the one or more applications indicating a validity of the shared incoming data upon completion of receiving the data packet.

13. The system of claim 12, wherein the executable instructions provide the completion notification to the one or more applications using a distributed key-value store once the shared incoming data is completely decompressed, decrypted, persisted, or a combination thereof.

14. The system of claim 8, wherein the executable instructions commit a change or perform a rollback of the change to the incoming data upon receipt of a completion notification.

15. A computer program product for speculative execution in a distributed streaming system by a processor, the computer program product comprising a non-transitory computer-readable storage medium having computer-readable program code portions stored therein, the computer-readable program code portions comprising:
an executable portion that shares incoming data comprising a portion of an incomplete data packet with one or more applications for immediate processing upon the incoming data becoming available on an input/output (I/O) interface to enable overlapping of computation and communication in the distributed streaming system; wherein the one or more applications speculatively execute the portion of the incomplete data packet, prior to receiving all portions of the incomplete data packet, upon the portion of the incomplete data packet becoming available on the I/O interface; and
an executable portion that indicates to the one or more applications a validity of the shared incoming data.

16. The computer program product of claim 15, further including an executable portion that process a nth sample of the incoming data using a processor cache component by the one or more applications upon receipt of a commencement notification.

17. The computer program product of claim 15, further including an executable portion that provides a commencement notification to the one or more applications using a distributed key-value store that supports encryption and compression of the incoming data.

18. The computer program product of claim 15, further including an executable portion that provides a commencement notification to the one or more applications of a nth sample of the incoming data to enable processing of the nth sample using a processor cache component by the one or more applications.

19. The computer program product of claim 15, further including an executable portion that:
provides a completion notification to the one or more applications indicating a validity of the shared incoming data upon completion of receiving the data packet; or
provides the completion notification to the one or more applications using a distributed key-value store once the shared incoming data is completely decompressed, decrypted, persisted, or a combination thereof.

20. The computer program product of claim 15, further including an executable portion that commits a change or perform a rollback of the change to the incoming data upon receipt of a completion notification.

* * * * *